(12) United States Patent
Wolpert et al.

(10) Patent No.: US 11,916,384 B2
(45) Date of Patent: Feb. 27, 2024

(54) REGION-BASED POWER GRID GENERATION THROUGH MODIFICATION OF AN INITIAL POWER GRID BASED ON TIMING ANALYSIS

(71) Applicant: International Business Machines Corporation, Armonk, NY (US)

(72) Inventors: David Wolpert, Poughkeepsie, NY (US); Basanth Jagannathan, Shrub Oak, NY (US); Michael Hemsley Wood, Wilmington, DE (US); Leon Sigal, Monsey, NY (US); James Leland, Arlington, TX (US); Alexander Joel Suess, Hopewell Junction, NY (US); Benjamin Neil Trombley, Hopewell Junction, NY (US); Paul G. Villarrubia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 17/479,246

(22) Filed: Sep. 20, 2021

(65) Prior Publication Data

US 2023/0090855 A1  Mar. 23, 2023

(51) Int. Cl.
*G05B 99/00* (2006.01)
*H02J 3/00* (2006.01)

(52) U.S. Cl.
CPC .......... *H02J 3/0073* (2020.01); *H02J 3/003* (2020.01); *H02J 3/004* (2020.01)

(58) Field of Classification Search
CPC .............................................. G05B 2219/2639
See application file for complete search history.

(56) References Cited

U.S. PATENT DOCUMENTS

| 6,609,242 B1 | 8/2003 | Slade et al. |
| 6,782,520 B1 | 8/2004 | Igusa et al. |
| (Continued) | | |

FOREIGN PATENT DOCUMENTS

EP    2395444 B1    12/2011

OTHER PUBLICATIONS

Pant, "Static Timing Analysis Considering Power Supply Variations", ICCAD-2005. IEEE/ACM International Conference on Computer-Aided Design, 2005, 8 pages.

*Primary Examiner* — Suresh Suryawanshi
(74) *Attorney, Agent, or Firm* — Cantor Colburn LLP; Jeffrey Ingalls

(57) ABSTRACT

Embodiments for power generation include defining a power tile within a power distribution network having a grid of power rails, the power tile having logic gates, and applying an initial power grid pattern from a plurality of power grid patterns for the power tile such that initial power grid pattern relates to timing characteristics of the logic gates of the power tile. The power grid patterns each have a different number of connectors connecting one power rail to another power rail in the grid of power rails. A subsequent power grid pattern is selected from the power grid patterns for the power tile such that the subsequent power grid pattern meets a threshold condition for the timing characteristics of the logic gates of the power tile. The timing characteristics for the logic gates are determined based on a voltage drop associated with the subsequent power grid pattern.

20 Claims, 13 Drawing Sheets

800

DEFINE A POWER TILE WITHIN A POWER DISTRIBUTION NETWORK, THE POWER DISTRIBUTION NETWORK COMPRISING A GRID OF POWER RAILS, THE POWER TILE COMPRISING LOGIC GATES  802

APPLY AN INITIAL POWER GRID PATTERN FROM A PLURALITY OF POWER GRID PATTERNS FOR THE POWER TILE SUCH THAT INITIAL POWER GRID PATTERN HAS TIMING CHARACTERISTICS OF THE LOGIC GATES COUPLED TO THE POWER TILE, THE PLURALITY OF POWER GRID PATTERNS EACH COMPRISING A DIFFERENT NUMBER OF CONNECTORS, THE CONNECTORS CONNECTING ONE POWER RAIL TO ANOTHER POWER RAIL IN THE GRID OF POWER RAILS  804

SELECT A SUBSEQUENT POWER GRID PATTERN FROM THE PLURALITY OF POWER GRID PATTERNS FOR THE POWER TILE SUCH THAT THE SUBSEQUENT POWER GRID PATTERN MEETS A THRESHOLD CONDITION FOR THE TIMING CHARACTERISTICS OF THE LOGIC GATES COUPLED TO THE POWER TILE, THE TIMING CHARACTERISTICS FOR THE LOGIC GATES ARE DETERMINED BASED ON A VOLTAGE DROP ASSOCIATED WITH THE SUBSEQUENT POWER GRID PATTERN HAVING BEEN SELECTED  806

(56) References Cited

U.S. PATENT DOCUMENTS

| | | |
|---|---|---|
| 7,590,953 B2 | 9/2009 | Chang |
| 8,615,725 B1 | 12/2013 | Keller et al. |
| 9,898,567 B2 | 2/2018 | Salodkar et al. |
| 10,242,145 B1* | 3/2019 | Anand ................. G06F 30/394 |
| 2004/0054979 A1* | 3/2004 | Bobba ................. G06F 30/367 |
| | | 716/111 |
| 2008/0195986 A1* | 8/2008 | Cohen ................. G06F 30/367 |
| | | 716/106 |
| 2009/0319250 A1* | 12/2009 | Yu ........................ G06F 30/367 |
| | | 703/14 |
| 2014/0201695 A1* | 7/2014 | Sigal .................... G06F 30/394 |
| | | 716/120 |
| 2020/0103445 A1* | 4/2020 | Medina Garcia ...... G01R 31/58 |
| 2022/0075923 A1* | 3/2022 | Tien .................. H01L 23/5226 |

\* cited by examiner

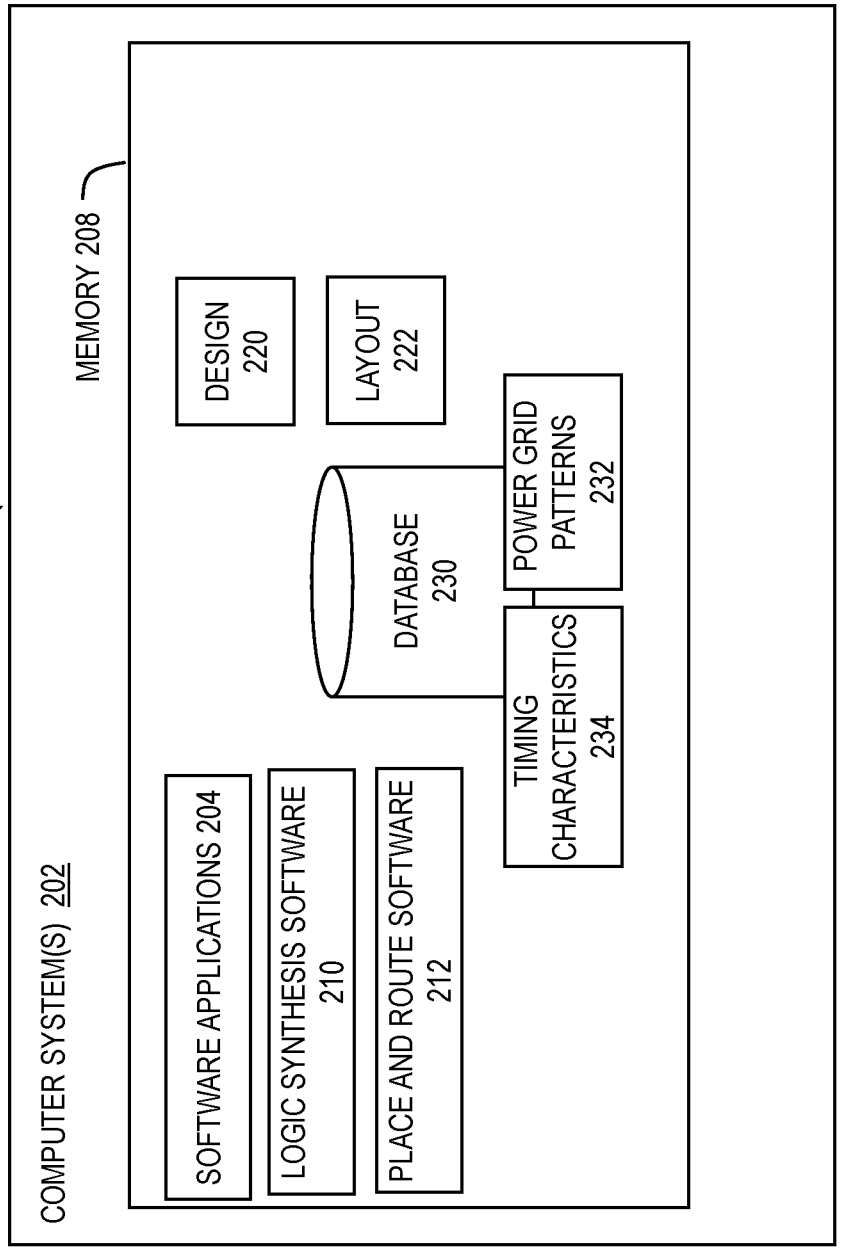

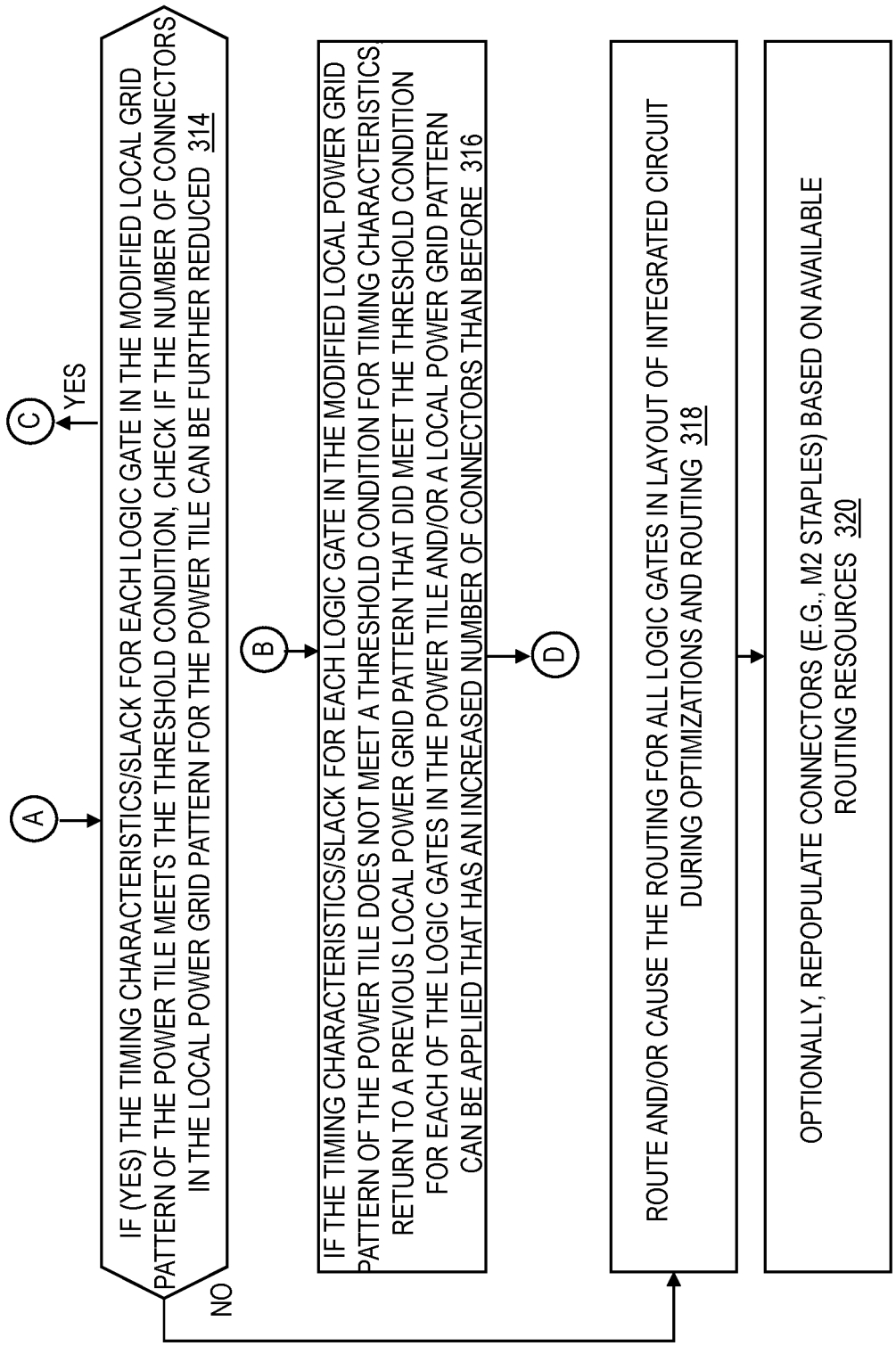

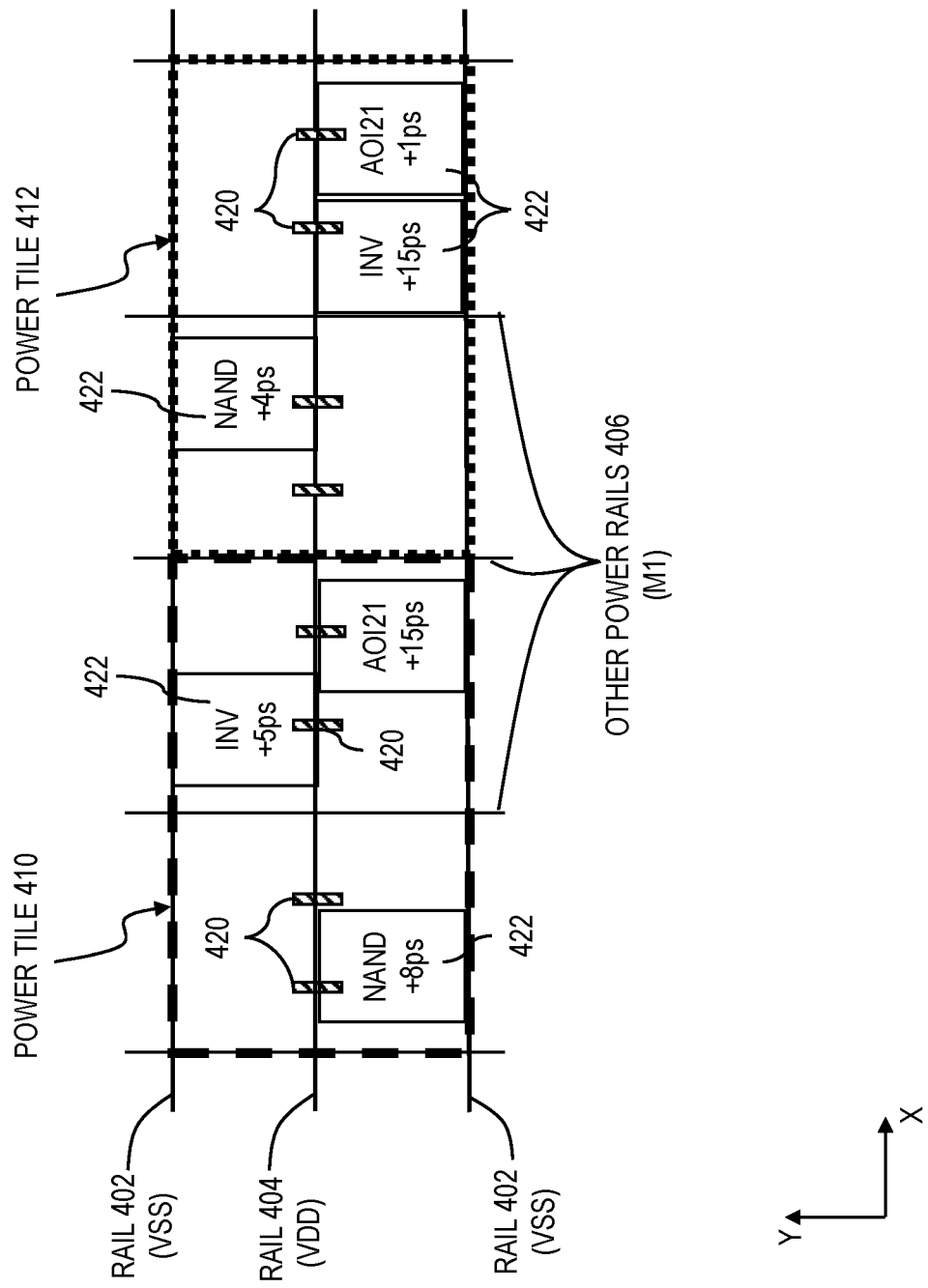

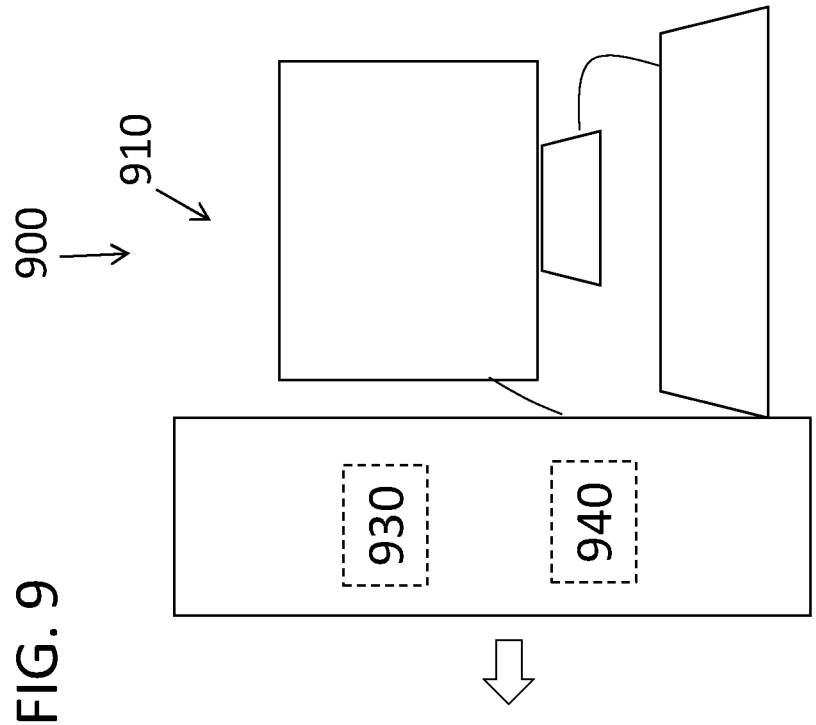
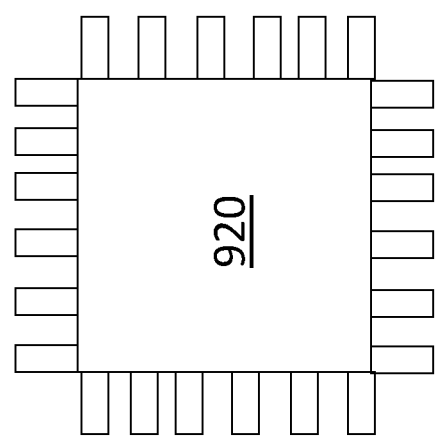
FIG. 9

US 11,916,384 B2

REGION-BASED POWER GRID GENERATION THROUGH MODIFICATION OF AN INITIAL POWER GRID BASED ON TIMING ANALYSIS

BACKGROUND

The present invention generally relates to computer systems, and more specifically, to computer-implemented methods, computer systems, and computer program products configured and arranged for region-based power grid generation through modification of an initial power grid based on timing analysis.

Integrated circuits (ICs), also referred to as chips or microchips, include electronic circuits on a wafer. The wafer is a semiconductor material, such as, for example, silicon or other materials. An IC is formed of a large number of devices on the wafer. The back-end-of-line (BEOL) is the second portion of IC fabrication where wiring of the IC is formed. The individual devices, such as transistors, capacitors, resistors, etc., are formed in earlier layers of the IC and interconnected with wiring in the BEOL layers of the wafer. The BEOL layer that includes the interconnection of wiring is referred to as the metallization layer, which generally begins when the first layer of metal (e.g., the M1 metal layer) is deposited on the wafer. BEOL layers of the IC generally include contacts, insulating layers (dielectrics), metal levels, bonding sites for chip-to-package connections, etc.

In ICs, electrical power is distributed to the components of the chip over a network of conductors on the chip. Power network design includes the analysis and design of such networks. As in all engineering, this involves tradeoffs. For example, the network should have adequate performance, be sufficiently reliable, but should not use more resources than required.

SUMMARY

Embodiments of the present invention are directed to computer-implemented methods for region-based power grid generation through modification of an initial power grid based on timing analysis. A non-limiting example computer-implemented method includes defining a power tile within a power distribution network, the power distribution network including a grid of power rails, the power tile including logic gates. An initial power grid pattern from a plurality of power grid patterns is applied for the power tile such that initial power grid pattern relates to timing characteristics of the logic gates of the power tile, the plurality of power grid patterns each including a different number of connectors, the connectors connecting one power rail to another power rail in the grid of power rails. The computer-implemented method includes selecting a subsequent power grid pattern from the plurality of power grid patterns for the power tile such that the subsequent power grid pattern meets a threshold condition for the timing characteristics of the logic gates of the power tile, the timing characteristics for the logic gates are determined based on a voltage drop associated with the subsequent power grid pattern having been selected.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts a block diagram of an example computing environment which is configured to provide region-based power grid generation for an integrated circuit through modification of an initial power grid based on timing analysis in accordance with one or more embodiments of the present invention;

FIG. 3B continues the flowchart of the computer-implemented process for providing region-based power grid generation for an integrated circuit through modification of an initial power grid based on timing analysis in accordance with one or more embodiments of the present invention;

FIG. 4 depicts an example layout of an integrated circuit having a power grid pattern for power distribution network in accordance with one or more embodiments of the present invention;

FIG. 9 is a block diagram of a system to design/layout a region-based power grid for an integrated circuit through modification of an initial power grid based on timing analysis in accordance with one or more embodiments of the present invention;

DETAILED DESCRIPTION

Figure 1:
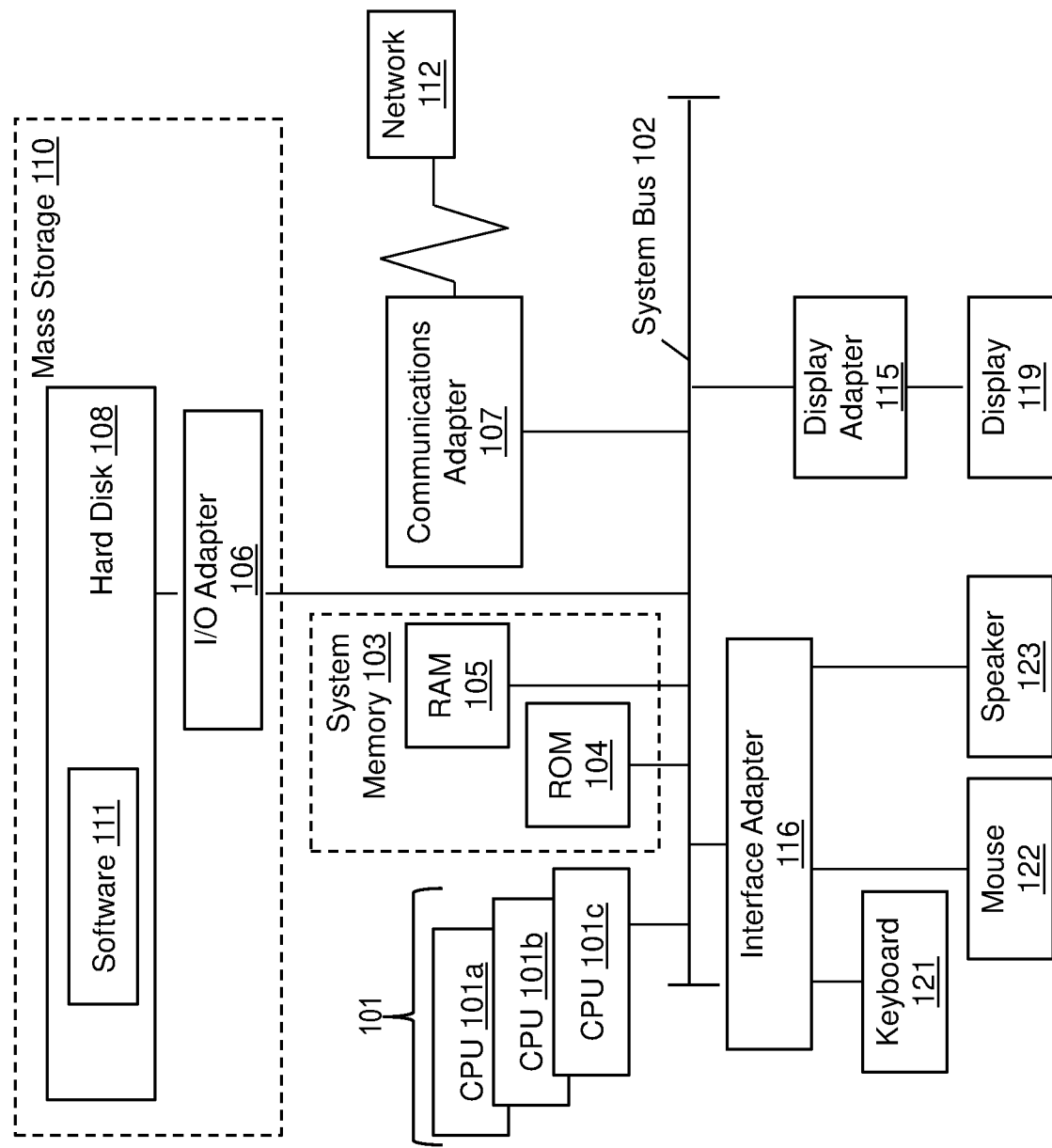
FIG. 1 depicts a block diagram of an example computer system for use in conjunction with one or more embodiments of the present invention.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

The power distribution network distributes power and ground voltages from pad locations to all devices in a design. Shrinking device dimensions, faster switching frequencies, and increasing power consumption in deep submicrometer technologies cause large switching currents to flow in the power and ground networks which degrade performance and reliability. A robust power distribution network ensures reliable operation of circuits on a chip. Power supply integrity verification is a concern in high-performance designs. Due to the resistance of the interconnects constituting the network, there is a voltage drop across the network, commonly referred to as the IR drop or IR-drop. The package supplies current to the pads of the power grid by means of package leads in wire-bond chips, through C4 bump arrays in flip chip technology, etc.

Excessive voltage drops in the power grid reduce switching speeds and noise margins of circuits and inject noise which might lead to functional failures. High average current densities lead to undesirable wearing out of metal wires due to electromigration (EM). Therefore, the challenge in the design of a power distribution network is in achieving robust voltage regulation at the consumption points notwithstanding the wide fluctuations in power demand across the chip, and to build such a network using minimum area of the metal layers. These issues are prominent in high performance chips such as microprocessors, because large amounts of power have to be distributed through a hierarchy of many metal layers. A robust power distribution network is sought to meet performance guarantees and ensure reliable operation.

The crux of the problem in designing a power grid is that there are many unknowns until the very end of the design cycle. Nevertheless, decisions about the structure, size, and layout of the power grid have to be made at very early stages when a large part of the chip design has not even begun. Unfortunately, most commercial tools focus on post-layout verification of the power grid when the entire chip design is complete and detailed information about the parasitic capacitances of the power and ground lines and the currents drawn by the transistors are known. Power grid problems revealed at this stage are usually very difficult or expensive to fix.

One or more embodiments of the present invention provide computer-implemented methods, computer systems, and computer program products arranged and configured for providing region-based power grid generation through modification of an initial power grid based on timing analysis. Power grid generation is a balancing act between routing resources and supplying current. In general, power grid generation revolves around complex power grid analysis tooling to verify power grids in order to source appropriate levels of current. One or more embodiments of the invention provide a new low-complexity alternative. In one or more embodiments of the invention, novel techniques include designing multiple local power grid patterns early (such as before route-and-wiring of logic gates, which may also be referred to as signal routing), assigning timing characteristics to logic gates based on each of the local power grids, and breaking a design area down to regions called "power tiles" which are bounded by a regular grid, such as bounded by power rails and/or staples on a given metal layer, where the positive supply volage (e.g., VSS) and ground and/or zero supply voltage (e.g., VDD) are counted separately. For each power tile, the novel technique looks at the logic gates and active fingers, selects a proper local power grid pattern (which can more or less populated with connectors than before) based on the timing characteristics for the power tile, performs routing (by applying region-aware timing characteristics to all logic gates during optimizations and routing), and repopulates rails/staples based on available routing resources.

The power distribution network forms a regular two-dimensional (2D) (horizontal and vertical) grid to transport the ground and power supplies to transistors throughout the chip. As discussed herein, there is a voltage drop (IR drop) associated with the resistance as the current flows from supply to the transistors. The voltage drop leads to degraded performance of logic gates because there is a minimum current required for transistor switching. During the physical synthesis, performing IR drop and switching analysis are central processing unit (CPU) extensive and complex. A uniform distribution of the power grid allows for assumptions about timing performance for logic gates to avoid incremental IR drop analysis, which generally meets a pessimistic standard. A uniform power distribution network can be designed to be robust enough to support any combination of logic gates and switching frequencies. Also, a uniform power distribution network can be designed (by starting from a grid) and can require additional power routing during or after signal routing, which requires frequent IR drop and electromigration analysis. By using the new low-complexity alternative, one or more embodiments of the invention provide power tiles as a non-regular grid within the original uniform grid based on optimization of each power tile. The timing analysis for each power tile is approximated ahead of time, thereby allowing for fewer connectors to be used to provide power supply (e.g., VDD) and ground supply (e.g., VSS) to the logic gates of the power tile according to one or more embodiments of the invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 is a block diagram of an example computing environment 200 which is configured to provide region-based power grid generation for an integrated circuit through modification of an initial power grid based on timing analysis according to one or more embodiments of the inventions. Computing environment 200 can include computer system(s) 202, which may include any of the hardware and software components and functionality discussed in computer system 100 of FIG. 1. Similarly, software applications 204 of computer system 202 may include functionality of software 111 for execution/processing on processors 101 to operate and function according to one or more embodiments discussed herein. Also, logic synthesis software 210 and place-and-route software 212 of computer system 202 may include functionality of software 111 for execution/processing on processors 101 to operate and function according to one or more embodiments. Additionally, computer system 202 may include processors 101 (not shown in FIG. 2) and memory 208. Memory 208 can include and/or be representative of any type of storage, system memory, hard disk, etc., discussed herein. Computing environment 200 may be representative of one or more portions of a cloud computing environment. Functions of computer system 202 in computing environment 200 can use and/or be implemented in workloads of workload layer 90 and any of the components of hardware and software layer 60 depicted in FIG. 12.

Many processes are performed to form an integrated circuit. In general, logic synthesis takes as an input a description of an integrated circuit expressed in a high-level hardware description language (HDL) that is a specialized computer language used to describe the structure and behavior of electronic circuits, such as digital logic circuits. An example description is design 220. Examples of hardware description languages include Verilog or VHDL. Other inputs include timing constraints for the design as well as the specific target implementation technology. Logic synthesis software then analyzes these inputs and maps them to a particular set of interconnected logic elements (e.g., logic gates) taken from cell libraries that are also provided as inputs to the process. Objectives of logic synthesis include optimization of timing, area, and power of the resultant design. The output of logic synthesis is then given to a place-and-route tool that performs the necessary actions to physically implement the circuit in silicon. The process of logic synthesis can be performed by logic synthesis software 210, and process of placement and routing can be performed by place-and-route software 212, the combination of which results in layout 222 of an integrated circuit. Logic synthesis software 210 and place-and-route software 212 can include functionality and operations which are well known to one of ordinary skill in art, along with any other standard processes. Logic synthesis software 210 and place-and-route software 212 (along with employing any other standard software components well known to one of ordinary skill in art) are used to perform logic synthesis, placement, clock optimization, wire synthesis, optimization, routing, routing based optimization, etc., to result in layout 22 of the integrated circuit.

Software application 204 can be integrated with logic synthesis software 210 and place-and-route software 212. Software application 204 can call on and/or employ logic synthesis software 210 and place-and-route software 212. Working with logic synthesis software 210 and place-and-route software 212, software application 204 is configured to provide region-based power grid generation for an integrated circuit through modification of an initial power grid based on timing analysis according to one or more embodiments of the invention. Software application 204 can monitor operations performed at various stages of logic synthesis software 210 and place-and-route software 212, and then software application 204 can execute accordingly such as during placement of logic gates in the power grid (but before wiring) provide region-based power grid generation for an integrated circuit through modification of an initial power grid based on timing analysis.

Figure 3A:
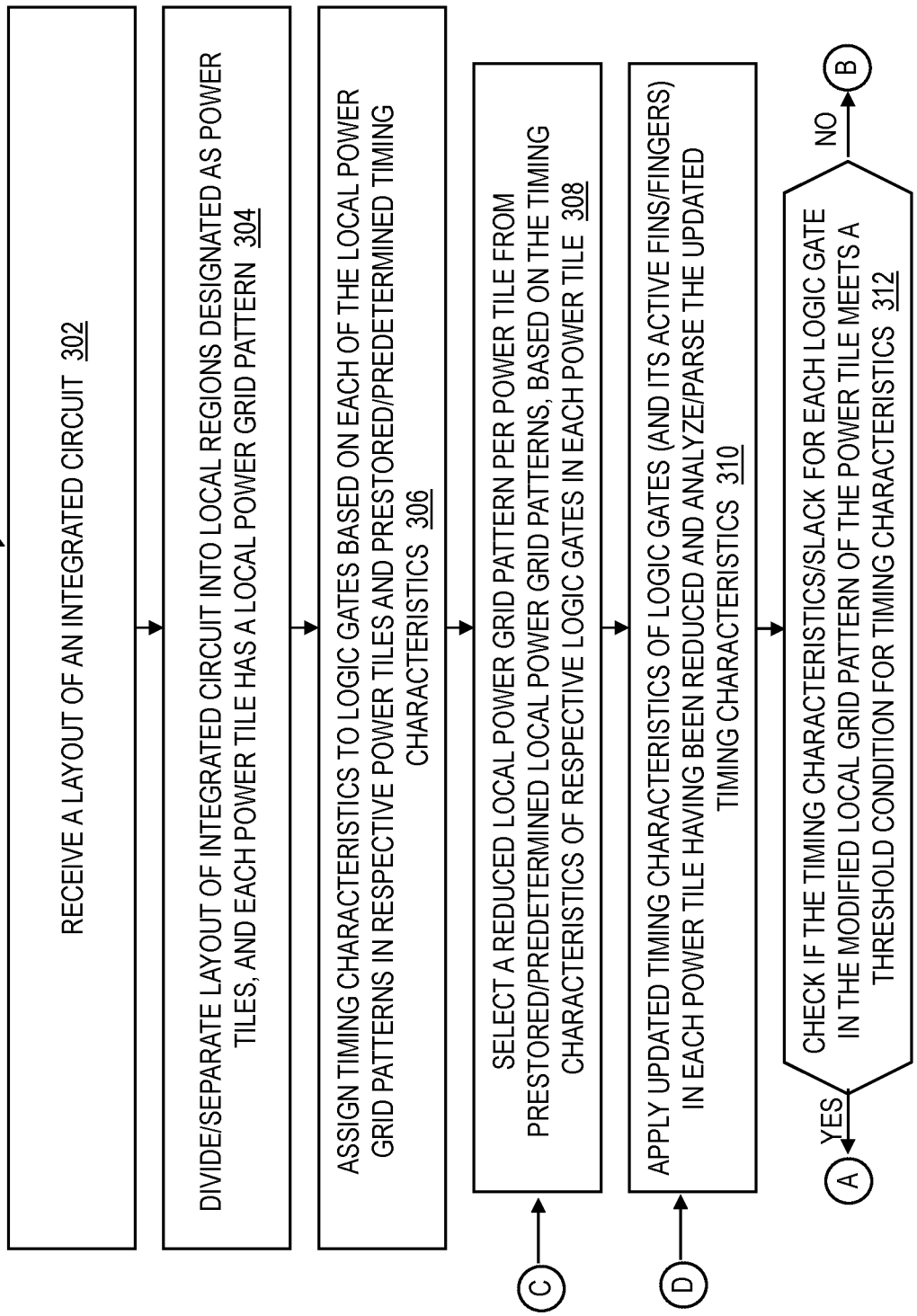
FIG. 3A is a flowchart of a computer-implemented process for providing region-based power grid generation for an integrated circuit through modification of an initial power grid based on timing analysis in accordance with one or more embodiments of the present invention.

FIGS. 3A and 3B depict a flowchart of a computer-implemented process 300 for providing region-based power grid generation for an integrated circuit through modification of an initial power grid based on timing analysis in accordance with one or more embodiments. Computer-implemented process 300 is executed by computer system 202 in FIG. 2 which will be described with reference, where appropriate, to FIGS. 4, 5, 6, and 7. Software application 204 works in conjunction with logic synthesis software 210 and place-and-route software 212, along with any other standard software and tools for creating and forming integrated circuits as understood by one skilled in the art. Also, the functionality of software application 204 can be integrated in place-and-route software 212 to perform as discussed herein.

At block 302, software application 204 executed on computer system 202 is configured to receive a layout of an integrated circuit, such as layout 222 of integrated circuit 400 depicted in FIGS. 4, 5, 6, and 7. At this point, the power rails for the positive power supply (e.g., VDD) and ground supply have been provided but routing of signal wires for logic gates has not been performed. FIG. 4 represents a portion of layout 222 of integrated circuit 400 in which novel aspects of the invention are discussed herein, and it should be appreciated that the novel aspects of the invention apply by analogy to the remainder of layout 222. In FIG. 4, layout 222 of integrated circuit 400 includes a power distribution network also interchangeably referred to as a power grid, which forms a two-dimensional (2D) grid of horizontal and vertical power rails which transport the ground and power supplies to logic gates in the integrated circuit. In FIG. 4, power rails 402 and 404 are illustrated as rows on the same metal level (e.g., metal layer 2 (M2)) that extend horizontally while other power rails 406 are illustrated as columns that run vertically on a different lower metal layer (e.g., metal layer 1 (M1)). Power rails 402 are illustrated as zero and/or ground supply (e.g., VSS which is generally referred to as ground or ground voltage), while power rails 404 are illustrated as positive power supply (e.g., VDD which is a positive supply voltage greater than the ground supply voltage). In one or more embodiments, the designations of ground supply and power supply can be switched for power rails 402, 404, such that power rails 402 could be for positive power supply (e.g., VDD) and power rails 404 could be for zero or ground supply (e.g., VSS).

At block 304, software application 204 is configured to divide/separate the layout 222 of integrated circuit 400 into local regions designated as power tiles, and each power tile has a local power grid pattern. The local power grid pattern denotes the number of connectors in a power tile that connects to a metal layer below, and the number of connectors can be different in some power tiles according the local power grid pattern that is selected. Power tiles are bounded by the power rails, generally in a rectangular shape, because the power rails are formed in a grid of vertical and horizontal power rails with power supply and ground supply intermingled regularly. In FIG. 4, example power tile 410 on the left and power tile 412 on the right are illustrated. Although two power tiles are illustrated for explanation purposes, it should be appreciated that numerous power tiles are present. In FIG. 4, power tiles 410, 412 are bounded by power rails 402, 404, 406. Left power tile 410 is depicted as a rectangular shape with long dashed lines, while right power tile 412 is depicted as a rectangular shape with short dashed lines. Software application 204 is configured to apply a predefined grid pattern selected from power grid patterns 232 to each power tile 410, 412, and initially, software application 204 can select a default power grid pattern that is used for initial analysis of region-based power gird generation. For the default power grid pattern, each power tile can be initially designated with a predefined/default number of connectors 420 to meet a pessimistic or worse-case scenario. For example, four connectors 420 are initially provided as the default for each power tile 410, 412 in FIG. 4. In this example, the connectors 420 are in direct connection with power rail 404 (upper-level power rails) and in direct connection with other power rails, power pads, contacts, etc., (not shown for conciseness) below; these lower-level power rails (such as power rails 406) are connected to various logic gates 422 to provide power supply (VDD) and ground supply (e.g., VSS) according to voltage provided by the upper-level power rails. Connectors 420 and power rails 402, 404 are on the same metal layer, for example, M2 metal layer which is above the M1 metal layer of other power rails 406, power pads, contacts, etc. Connectors 420 are highly conductive material such as metals, metal alloys, etc., which directly connect to the lower-level power rails including lower power pads, contacts, etc. For example, connectors 420 can be utilized to connect power rail 404 to another power rail directly under power rail 404.

Various power grid patterns 232, each power grid pattern having its own predefined number of connecters, may be stored in advance in database 230 for selection by software application 204. The power grid patterns 232 can be for different sizes, such as different X and Y sizes generally forming a rectangular box or shape. For a power grid pattern for a power tile, there is a given rectangular size having X and Y dimensions, with a given number of connectors 420, such that the power tile has a predetermined voltage drop and a predetermined electromigration for a given local power grid pattern in power grid patterns 232.

Referring to FIG. 3A, at block 306, software application 204 is configured to assign timing characteristics to logic gates 422 based on each of the local power grid patterns in respective power tiles 410, 412 and prestored/predetermined timing characteristics 234. In FIG. 4, software application 204 is configured to assign a timing characteristic such as a slack to each logic gate 422 in each power tile 410, 412 based on the respective number of connectors 420 for the local power grid pattern, where the rectangular size and the number of connectors 420 are associated with a given voltage drop (and electromigration) for a power tile. Timing characteristics 234 can be stored in database 230 in advance for various logic gates 422 for selection by software application 204. As example timing characteristics for the initial local power grid pattern (i.e., full M2 connector grid) in FIG. 4, power tile 410 includes the NAND (NOT AND) logic gate 422 having the timing characteristic of +8 picoseconds (ps), the INV (inverter) logic gate 422 having +5 ps, and the AOI21 (AND-OR-INVERT 2-1) logic gate 422 having +15 ps. As seen in FIG. 4, power tile 412 includes the NAND logic gate 422 having the timing characteristic of +4 ps, the INV logic gate 422 having +15 ps, and the AOI21 logic gate 422 having +1 ps. For the initial/default local power grid pattern, both power tiles 410, 412 have logic gates 422 that meet or exceed clock frequency.

A zero value for the timing characteristic or slack meets the clock frequency for the integrated circuit 400, and a positive value for the timing characteristic or slack exceeds and/or is faster than the clock frequency. However, a negative value for the timing characteristic or slack fails to meet clock frequency and/or is slower than the clock frequency, and the power grid pattern is modified when a logic gate has a negative value.

There are many options to determine the characteristics in advance for local power grids patterns 232 of power tiles and timing characteristics 234 for logic gates. In one or more embodiments, one option is to create hardware with different regular local power grid patterns, and based on each local power grid pattern, determine and assign a fixed penalty to use for each logic gate. The fixed penalty is the amount the timing characteristic decreases from its highest/best slack value for the default local power grid pattern with each incremental removal of a connector (and/or maybe two connectors) to result in a different local power grid pattern. For example, at the default local power grid pattern for a power tile which has the maximum number of connectors, a logic gate 422 has the maximum value and/or best timing characteristic/slack value. When the local power grid of that power tile is reduced to a number of connectors less than the maximum number, the logic gate 422 in the power tile has a (known) fixed penalty stored in timing characteristics 234 such that the timing characteristic/slack is reduced to a value less than the maximum value and/or best timing characteristic/slack value for the logic gate 422. Each local power grid pattern has its own associated voltage drop (i.e., IR drop) in local power grid patterns 232. For example, local power grid patterns 232 has a full connector power grid pattern (e.g., 100% of the connectors (e.g., default) and/or a predefined voltage drop), a reduced number of connectors in power grid pattern (e.g., with an increased voltage drop), a further reduced number of connectors in a power grid pattern (e.g., a further increased voltage drop), and so forth.

Similarly, each logic gate has its own timing characteristic associated with a voltage drop, and the timing characteristic for each type of logic gate is stored in advance in timing characteristics 234. In one example, timing characteristics 234 has a slack for each logic device at full connector power grid pattern (e.g., 100% of the connectors (e.g., default) and/or a predefined voltage drop), a reduced number of connectors in power grid pattern (e.g., an increased voltage drop), a further reduced number of connectors in a power grid pattern (e.g., a further increased voltage drop), and so forth.

In one or more embodiments, the content of timing characteristics 234 for logic gates 420 and the various local power grid patterns in local power grid pattern 232 can be combined in a table where reduction in connectors 420 for each local power grid pattern (in power grip patterns 232) is associated an increase in delay for logic gates 422 in timing characteristics 234. Software application 204 is configured to, for a given local power grid pattern with a given voltage drop and a given timing (or timing delay) for logic gate for the given voltage drop, apply the timing characteristics to that given logic gate to determine if the slack remains the same, increases by a certain amount of time, and/or decreases by a certain amount of time.

Further, in one or more embodiments, a detailed simulation can be performed that considers the effect of a large number of switching fins of transistors (for a logic gate) in a local region, and the simulation can monitor and capture the IR drop associated with the power getting to those transistors, which can be stored in timing characteristics 234. That analysis can provide software application 204 with a timing penalty to associate with each local power grid pattern for a respective logic gate. In one or more embodiments, there could be pessimistic (and/or worse-case scenario) penalties associated with different local power grid patterns for a power tile.

It should be appreciated that voltage drop for a given local power grid pattern of a power tile and the timing characteristic (and/or slack value) for a given logic gate in that power tile are known in advance by software application 204, using database 230 having timing characteristics 234 and local power gird patterns 232. Novel aspects of the invention provide technical solutions for integrated circuit design and manufacture unlike typical techniques that modify the power grid based on performing extremely CPU intensive IR drop analysis on the fly, and potentially, for instance, adding new routes to the power distribution. According to one or more embodiments of the invention, the novel technique of having penalties (e.g., increases in slack) associated with different local power grid patterns allows software application 204 to change the power grid pattern while performing other common optimizations during pre-signal routing in place and route flows (for example, gate powering up or down). This allows one or more embodiments of the invention to perform signal routing with a changed power grid pattern while being confident that the subsequent detailed analysis on the routed product (i.e., integrated circuit) will not suffer due to the IR drop of the changed power grids.

Although the timing penalty is discussed, one or more embodiments additionally maintain electromigration penalties and/or thresholds for local power grid patterns having a certain numbers of logic gates for the local power grid pattern, which the local gates draw current that causes electromigration; accordingly, software application 204 accounts for electromigration concerns with too many switching fins in a given region (e.g., local power grid pattern for a power tile) at the same time with too sparse of a local power grid pattern. A dense local power grid pattern for a power tile has more connectors 420 than a sparse local power grid pattern. However, having fewer connectors 420 allows for more real estate and/or space on the integrated circuit (i.e., chip, wafer, etc.) for subsequently routing signal wires as desired. Electromigration relates to the condition of failing to supply sufficient current for the transistors to function at all versus supplying enough current. Electromigration is independent of the IR drop penalty and tends to happen when there are too many switching fins in the same area. In accordance with one or more embodiments, local power grid patterns 232 and/or timing characteristics 234 can maintain two separate things (similar to the timing penalty) for use by software application 204: (1) how many switching fins could each local power grid pattern tolerate, and (2) which logic gates are so powerful that they should never use certain sparse power grids (e.g., a clock buffer).

Figure 5:
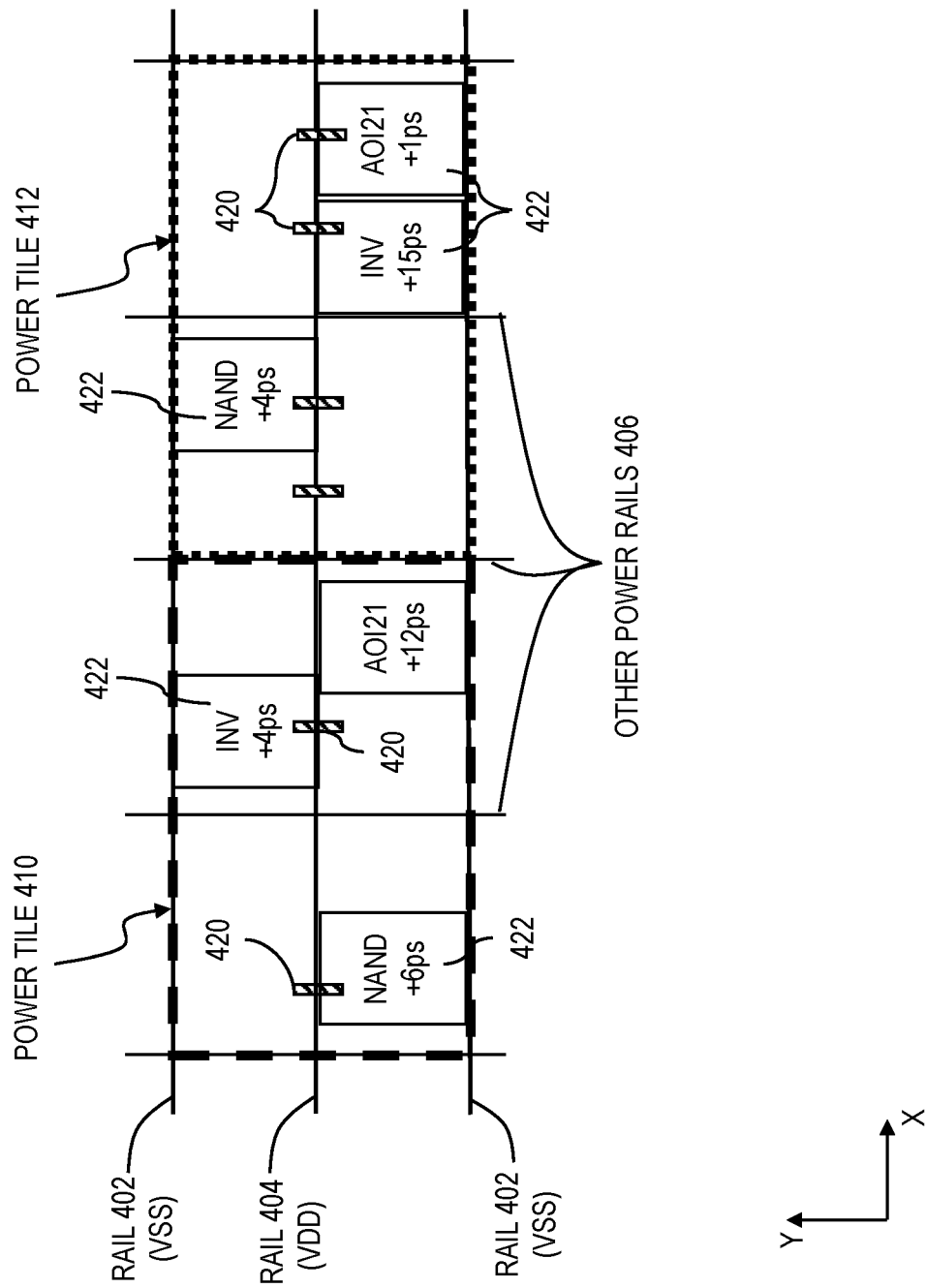
FIG. 5 depicts an example layout of an integrated circuit having a power grid pattern for power distribution network in accordance with one or more embodiments of the present invention.

Referring to FIG. 3A, at block 308, software application 204 is configured to select a reduced local power grid pattern per power tile from prestored/predetermined local power grid patterns 232, based on the timing characteristics of respective logic gates 422 in each power tile. The selected local power grid pattern for the power tile has fewer connectors 420 than the previous local power grid pattern (e.g., such as the default local power grid pattern). Although reduced local power grid patterns can be selected and applied for multiple power tiles simultaneously, FIG. 5 represents a portion of layout 222 of integrated circuit 400 which depicts a reduced local power grid pattern for power tile 410 for explanation purposes, without modifying the local power grid pattern for power tile 412. As seen in FIG. 5 of layout 222 for integrated circuit 400, power tile 410 has a local power grid pattern that has reduced from four connectors 420 to two connectors 420.

At block 310, software application 204 is configured to apply updated timing characteristics of logic gates 422 (and its active fins/fingers) in each power tile having been reduced and analyze/parse the updated timing characteristics. It should be noted that blocks 306 and 308 can be performed as a combined optimization process and can be implemented in the place and route flow. In one or more embodiments, software application 204 is configured to, for each logic gate 422 and its active fingers, determine and communicate the relevant timing characteristics and gate information to each power tile using the information in the timing characteristics 234 and the information in the local power grid patterns 232. For each power tile, software application 204 is configured to determine the impact to timing and electromigration of each of the power tiles and choose the sparsest of the predefined power grid patterns that still fits the timing needs/slack value of the logic gates in the power tile. Accordingly, depending on how the initial grid was set up and/or results of a previous iteration of this optimization operation, this may involve switching to a more populated power grid pattern or a less populated power grid pattern for the power tile as discussed further herein.

In power tile 410 of FIG. 5, software application 204 determines that NAND logic gate 422 has a timing characteristic of +6 ps, INV logic gate 422 has +4 ps, and AOI21 logic gate has +12 ps, as a result of the less populated grid pattern. Software application 204 can obtain the associated voltage drop for the given local power grid pattern in power grid patterns 232, and use the associated voltage drop (value) to determine the delay (and/or fixed penalty) from timing characteristics 234 for each logic gate 422 in the power tile, which results in the slack in power tile 410 illustrated in FIG. 5.

At block 312, software application 204 is configured to check if the timing characteristics/slack for each logic gate 422 in the modified local grid pattern of the power tile meets a threshold condition for timing characteristics. For example, after modifying power tile 410 to a less populated power grid pattern having fewer connectors 420, software application 204 checks if each individual timing characteristic/slack for each logic gate meets a predefined timing threshold. For example, the predefined timing threshold could be at least a positive value, a slack value greater than zero, etc. In one or more embodiments, the predefined timing threshold could be a +1 value, greater than 0 value, at least a 0 value, at least +2 value, etc.

Referring to FIG. 3B, at block 314, if (Yes) the timing characteristic/slack for each logic gate in the modified local grid pattern of the power tile meets the threshold condition, software application 204 is configured to check if the number of connectors 420 in the local power grid pattern for the power tile can be further reduced. For example, the timing characteristics of each logic gate 422 in the power tile may be positive enough, such as above a predetermined positive value, so that a further reduced local power grid pattern can be applied which further reduces the number of connectors 420. If (Yes) the timing characteristic for each logic gate 422 has a large enough positive value which is predefined in advance, flow returns to block 308. Otherwise, if (No) the timing characteristic for each logic gate 422 does not have a large enough positive value for the number of connectors to be further reduced, flow proceeds to block 318.

Although blocks 308, 310, 312, and 314 are shown separately, in one or more embodiments one or more of blocks 308, 310, 312, and 314 can be integrated in any combination such that for each power tile, software application 204 is configured to concurrently apply/try each power grid pattern in power grid patterns 232, analyze the state of timing for the logic gates 422 in a particular power tile for each power grid pattern, and select the power grid pattern with the least amount of routing/connectors 420 where the slack is still positive.

Figure 6:
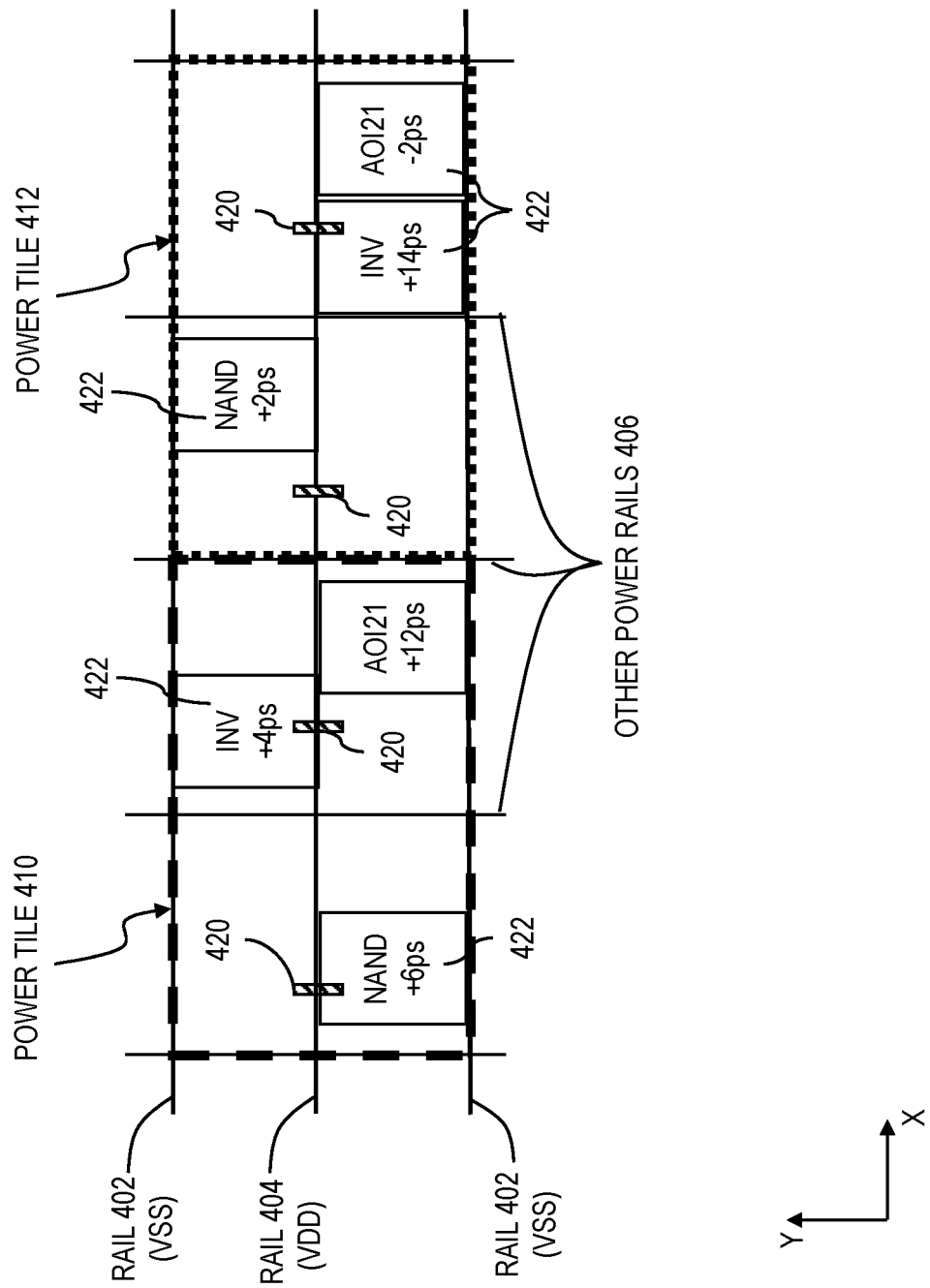
FIG. 6 depicts an example layout of an integrated circuit having a power grid pattern for power distribution network in accordance with one or more embodiments of the present invention.
Figure 7:
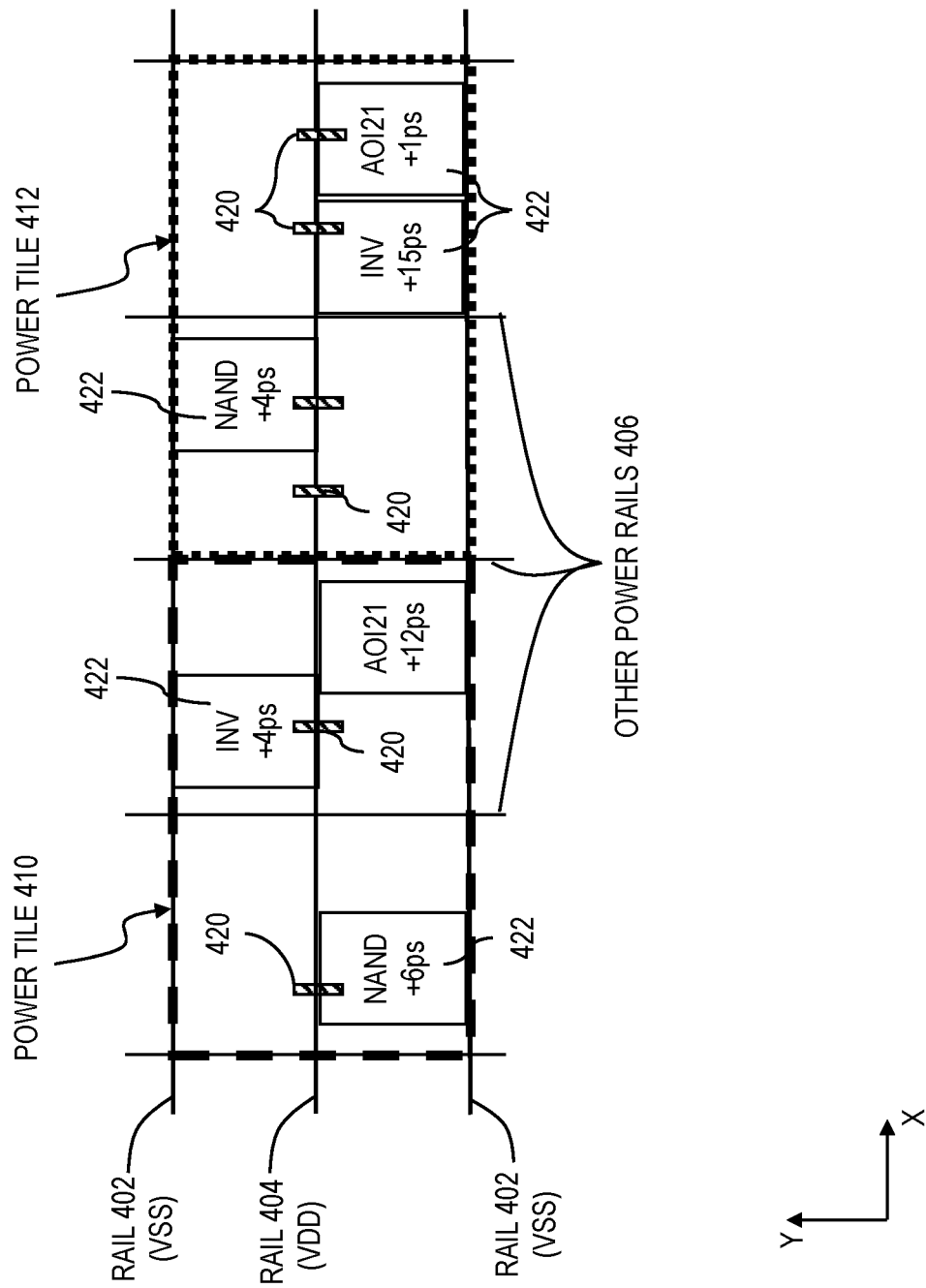
FIG. 7 depicts an example layout of an integrated circuit having a power grid pattern for power distribution network in accordance with one or more embodiments of the present invention.

At block 316, if the timing characteristics/slack for each logic gate 422 in the modified local power grid pattern of the power tile does not meet a threshold condition for timing characteristics, software application 204 is configured to return a previous local power grid pattern that did meet the threshold condition for each of the logic gates in the power tile and/or a local power grid pattern can be applied that has an increased number of connectors than before. Subsequently, flow returns to block 310. This example scenario is illustrated in FIGS. 6 and 7 with respect to power tile 412. For example, software application 204 has applied a reduced power grid pattern to power tile 412, which has changed from four connectors 420 to two connectors 420 (i.e., one-half the number of connectors 420 or M2 staples), as depicted in FIG. 6. Software application 204 performs a timing analysis to determine that AOI21 logic gate 422 has dropped from +1 ps value in FIG. 5 to −2 ps value in FIG. 6, which does not meet the threshold condition for a positive slack. Accordingly, software application 204 is configured to revert back to and/or select the power grid pattern for power tile 412 where the slack is still positive for all logic gates 422 including AOI21 logic gate 422 as shown in FIG. 7. It is noted that power tile 410 has already been optimized and no changes are shown to power tile 410 in FIGS. 6 and 7.

At block 318, software application 204 is configured to route and/or cause the routing for all logic gates in layout 222 of integrated circuit 400 during optimizations and routing. Routing is for all power tiles. Software application 204 may apply and/or employ a region-aware timing characteristics to all logic gates during optimizations and routing as understood by one of ordinary skill in the art. Routing includes signal routing between all logic gates as understood by one of ordinary skill in the art. By using the infrastructure of according to embodiments of the invention, software application 204 knows and provides place-and-route software 212 with the state (both number of connectors 420 and slack for each logic gate 420) of a current power tile, such that software application 204 causes place-and-route software 212 to apply relevant timing penalties to ensure that all timing aware optimizations and routing operations see a penalized timing to cover for the associated IR drop of the different power grid patterns applied to the power tiles. As such, routing the layout 222 of integrated circuit 400 results in a fully functional integrated circuit 400 as understood by one of ordinary skill in the art.

At block 320, optionally, software application 204 is configured to repopulate connectors 420 (e.g., M2 staples) based on available routing resources. For example, once signal routing has been performed and the timing and performance goals are met for the layout 222 of integrated circuit 400, software application 204 is configured to return to more a robust power grid pattern for any power tiles where the additional signal routes were not needed. As noted herein, each connector 420 occupies physical space in the integrated circuit 400, and when a connector 420 is removed according to a reduced power grid pattern, this free physical space is available for signal routing of logic gates 422. When any of the free physical space of a connector 420 is not utilized during signal routing, software application 204 reclaims this physical space and uses the physical space to add the removed connector back to its original location. This provides more relief when performing logical Engineering Change Orders (ECOs), and also improves reliability during manufacture.

Although the example of providing region-based power grid generation for integrated circuit 400 through modification of the initial power grid based on timing analysis is discussed for the VDD power supply on power rails 404, this optimization also applies by analogy and is repeated for VSS ground supply on power rails 402 although no connectors are illustrated for simplicity. The VSS grid is equivalent to the VDD grid and will have similar timing and electromigration characteristics. The only difference is that the VSS grid is staggered from the VDD grid. So, for instance in FIG. 4, if one were to picture the power tile bounded by power rail 404 and other rails 406, that will form a power tile for the VSS grid. Also in practice, there are the same M2 staples (e.g., connectors 420) along the VSS rails. Those will be the staples that will be subject to a changed power grid pattern.

Figure 8:
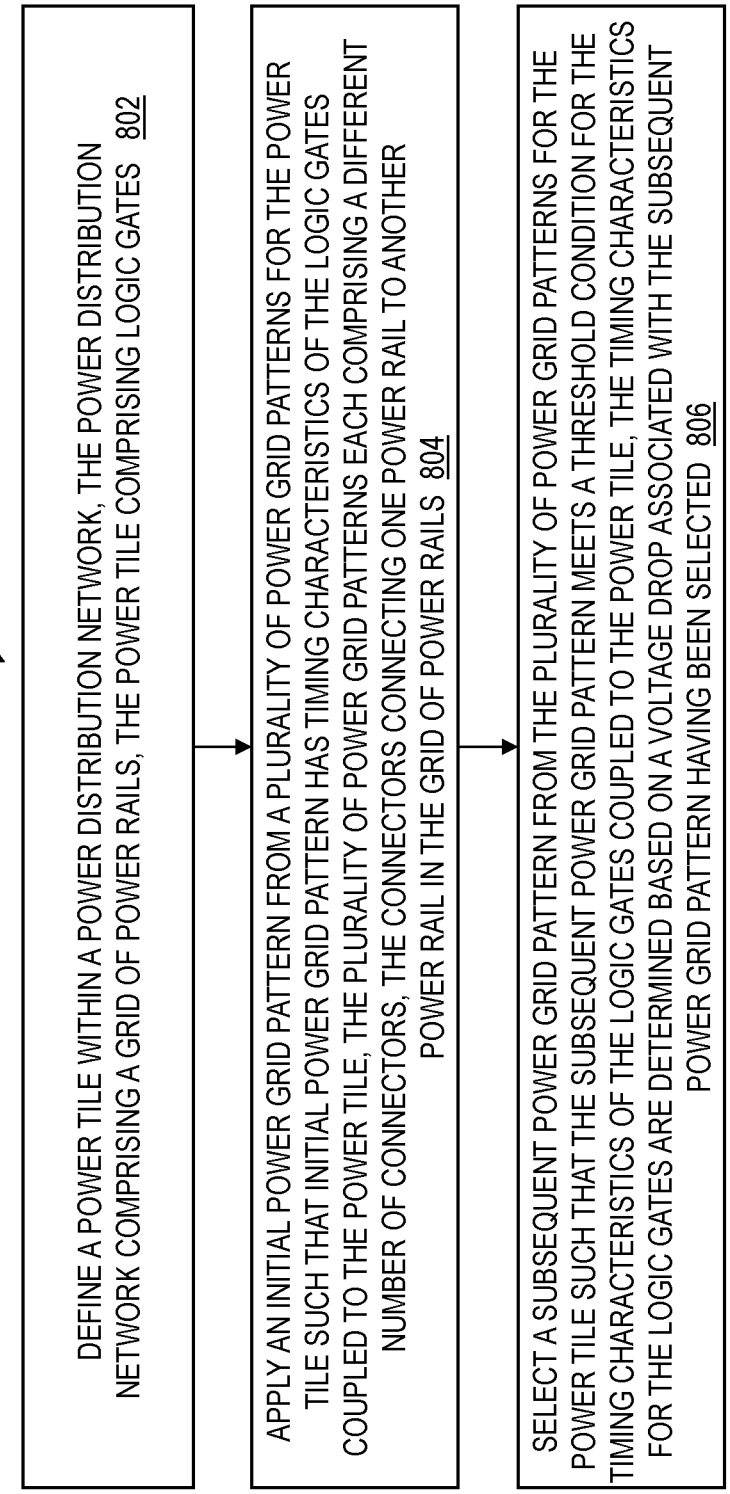
FIG. 8 is a flowchart of a computer-implemented method for region-based power grid generation through modification of an initial power grid in an integrated circuit based on timing analysis in accordance with one or more embodiments of the present invention.

FIG. 8 is a flowchart of a computer-implemented method 800 for region-based power grid generation through modification of an initial power grid in integrated circuit 400 based on timing analysis in accordance with one or more embodiments of the invention. Computer-implemented method 800 may be performed using computer system 202 in FIG. 2. Processors 101 in FIG. 1 along with or any other processor discussed herein can include and/or implement functions of metadata predictor 200 discussed herein. As noted herein, functions of processor 101 can be used and/or implemented in hardware components of hardware and software layer 60 depicted in 12.

At block 802 of computer-implemented method 800, software application 204 is configured to define a power tile (e.g., power tiles 410, 412) within a power distribution network, the power distribution network comprising a grid of power rails (e.g., power rails 402, 404, and other power rails 406), the power tile comprising logic gates (e.g., respective logic gates 422).

At block 804, software application 204 is configured to apply an initial power grid pattern from a plurality of power grid patterns 232 for the power tile (e.g., power tile 410, 412 as depicted in FIG. 4) such that initial power grid pattern relates to timing characteristics of the logic gates 422 coupled to the power tile, the plurality of power grid patterns 232 each comprising a different number of connectors 420, the connectors 420 connecting one power rail to another power rail in the grid of power rails.

At block 806, software application 204 is configured to select a subsequent power grid pattern from the plurality of power grid patterns 232 for the power tile such that the subsequent power grid pattern meets a threshold condition for the timing characteristics of the logic gates 422 coupled to the power tile (e.g., power tile 410 is coupled to NAND logic gate 422 with slack +6 ps, INV logic gate with slack +4 ps, and AOI21 logic gate 422 with slack +12 ps in the reduced power grid pattern depicted in FIG. 5), the timing characteristics for the logic gates 422 are determined based on a voltage drop associated with the subsequent power grid pattern having been selected.

A number of the connectors 420 in the subsequent power grid pattern (e.g., selected from power grid patterns 232) corresponds to the voltage drop associated with the power tile (e.g., power tile 410) and has fewer connectors 420 than the initial power grid pattern for the power tile. Meeting the threshold condition (e.g., a positive slack, a slack equal to and/or greater than zero, etc.) for the timing characteristics of the logic gates 422 coupled to the power tile is based on the voltage drop associated with the subsequent power grid pattern. The subsequent power grid pattern for the power tile is selected to have a number of the connectors 420 that meet the threshold condition for the timing characteristics of the logic gates 422 coupled to the power tile (e.g., power tile 410), the subsequent power grid pattern having a value for the voltage drop that is sufficient for the timing characteristics of the logic gates 422.

Responsive to selecting ones of the plurality of power grid patterns for a plurality of power tiles, wires (not shown) are routed wires for all logic gates 422 (e.g., across different power tiles). Software application 204 can cause and/or instruct place-and-route software 212 to route the wires for logic gates 422 in layout 222 of integrated circuit 400. Software application 204 is configured to determine that at least one location (e.g., a previous location) of at least one connector 420 in the power tile remains empty responsive to routing wires for the logic gates. For example, no wires cross and/or occupy the previous location of the connector 420 that has been removed. Software application 204 is configured to populate the at least one location with the at least one connector 420 in the power tile such that a number of the connectors 402 in the power tile is increased. For example, after wire routing has been performed by place-and-route software 212, software application 204 is configured to place the previously removed connector 420 back its previous location in the particular power tile.

FIG. 9 is a block diagram of a system 900 for according to embodiments of the invention. The system 900 includes processing circuitry 910 used to generate the design 930 that is ultimately fabricated into an integrated circuit 920 (such as, e.g., integrated circuit 400). The steps involved in the fabrication of the integrated circuit 920 are well-known and briefly described herein. Once the physical layout 940 (such as, e.g., layout 222) is finalized, based, in part, on region-based power grid generation through modification of an initial power grid based on timing analysis according to embodiments of the invention to facilitate optimization of the routing plan, the finalized physical layout 940 is provided to a foundry. Masks are generated for each layer of the integrated circuit based on the finalized physical layout. Then, the wafer is processed in the sequence of the mask order. The processing includes photolithography and etch. This is further discussed with reference to FIG. 10.

Figure 10:
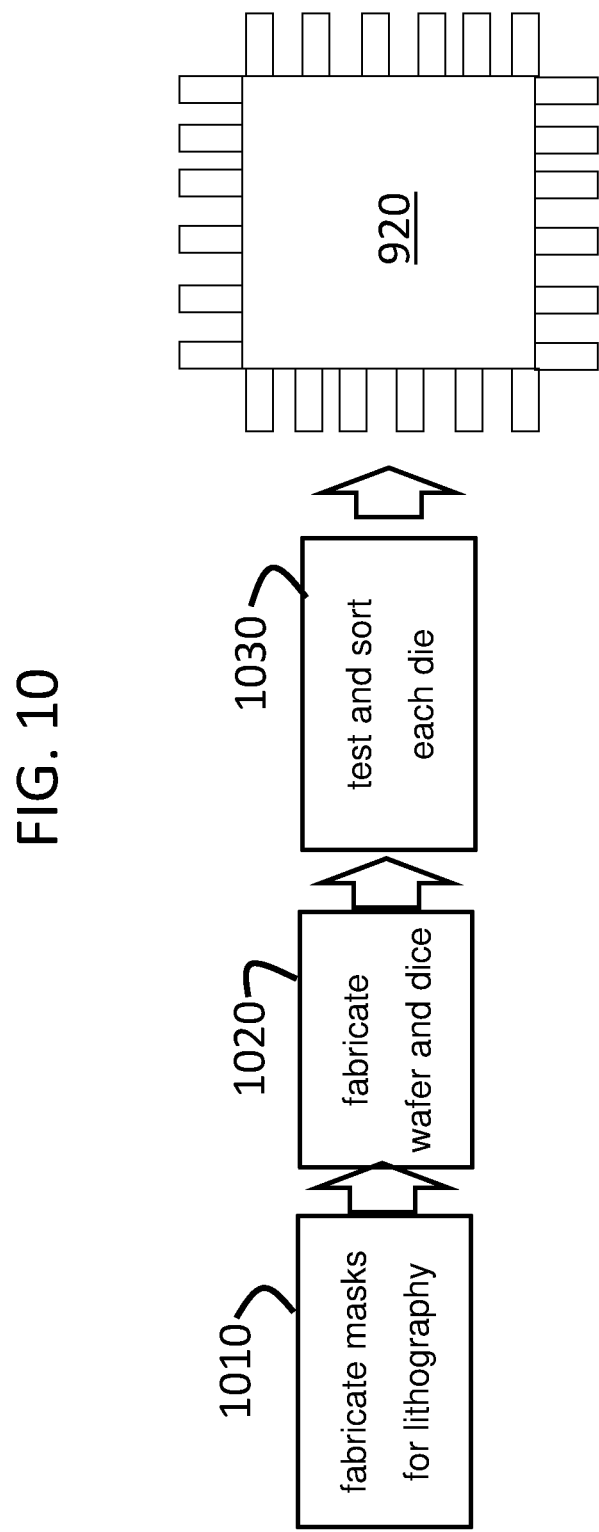
FIG. 10 is a process flow of a method of fabricating the integrated circuit of FIG. 9 in accordance with one or more embodiments of the present invention.

FIG. 10 is a process flow of a method of fabricating the integrated circuit according to exemplary embodiments of the invention. Once the physical design data is obtained, based, in part, on region-based power grid generation through modification of an initial power grid based on timing analysis, the integrated circuit 920 can be fabricated according to known processes that are generally described with reference to FIG. 10. Generally, a wafer with multiple copies of the final design is fabricated and cut (i.e., diced) such that each die is one copy of the integrated circuit 920. At block 1010, the processes include fabricating masks for lithography based on the finalized physical layout. At block 1020, fabricating the wafer includes using the masks to perform photolithography and etching. Once the wafer is diced, testing and sorting each die is performed, at block 1030, to filter out any faulty die.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
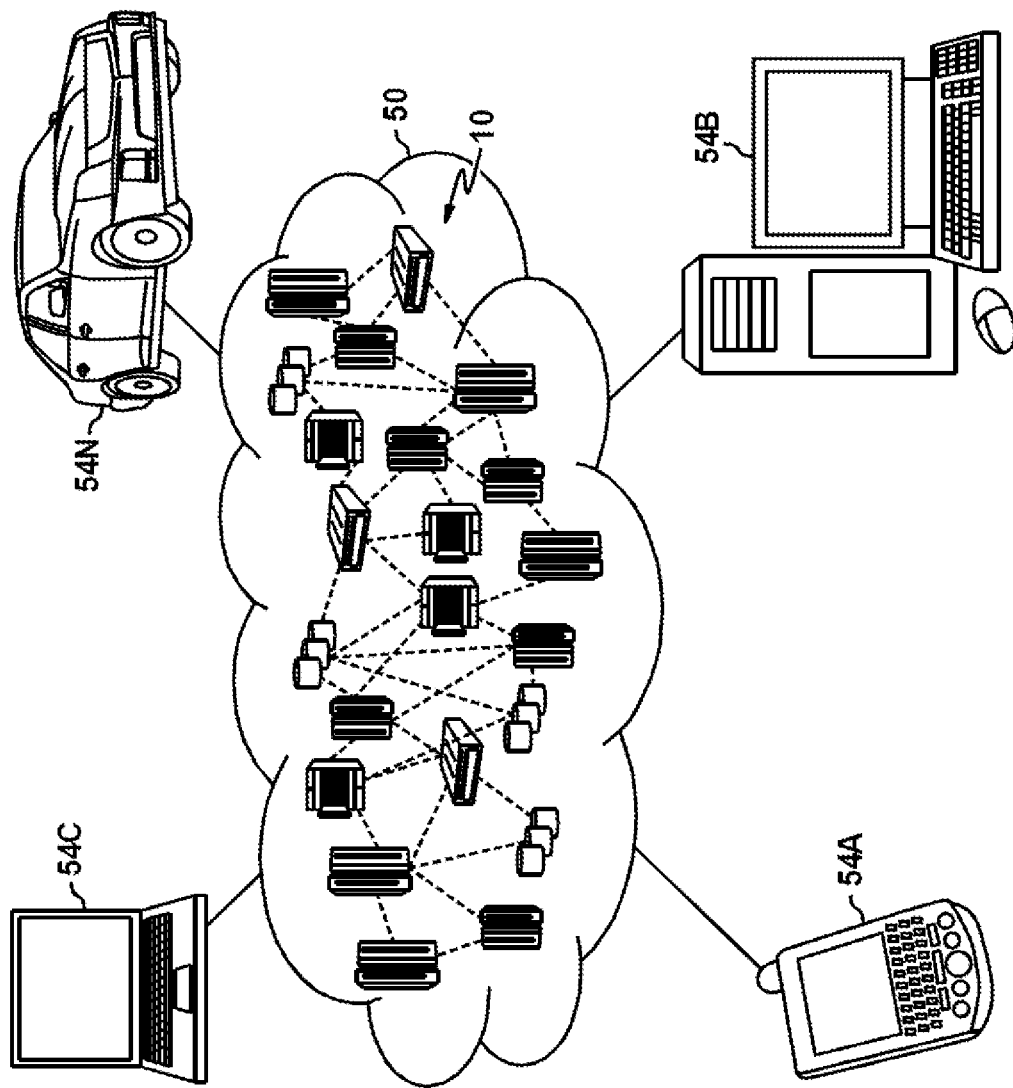
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
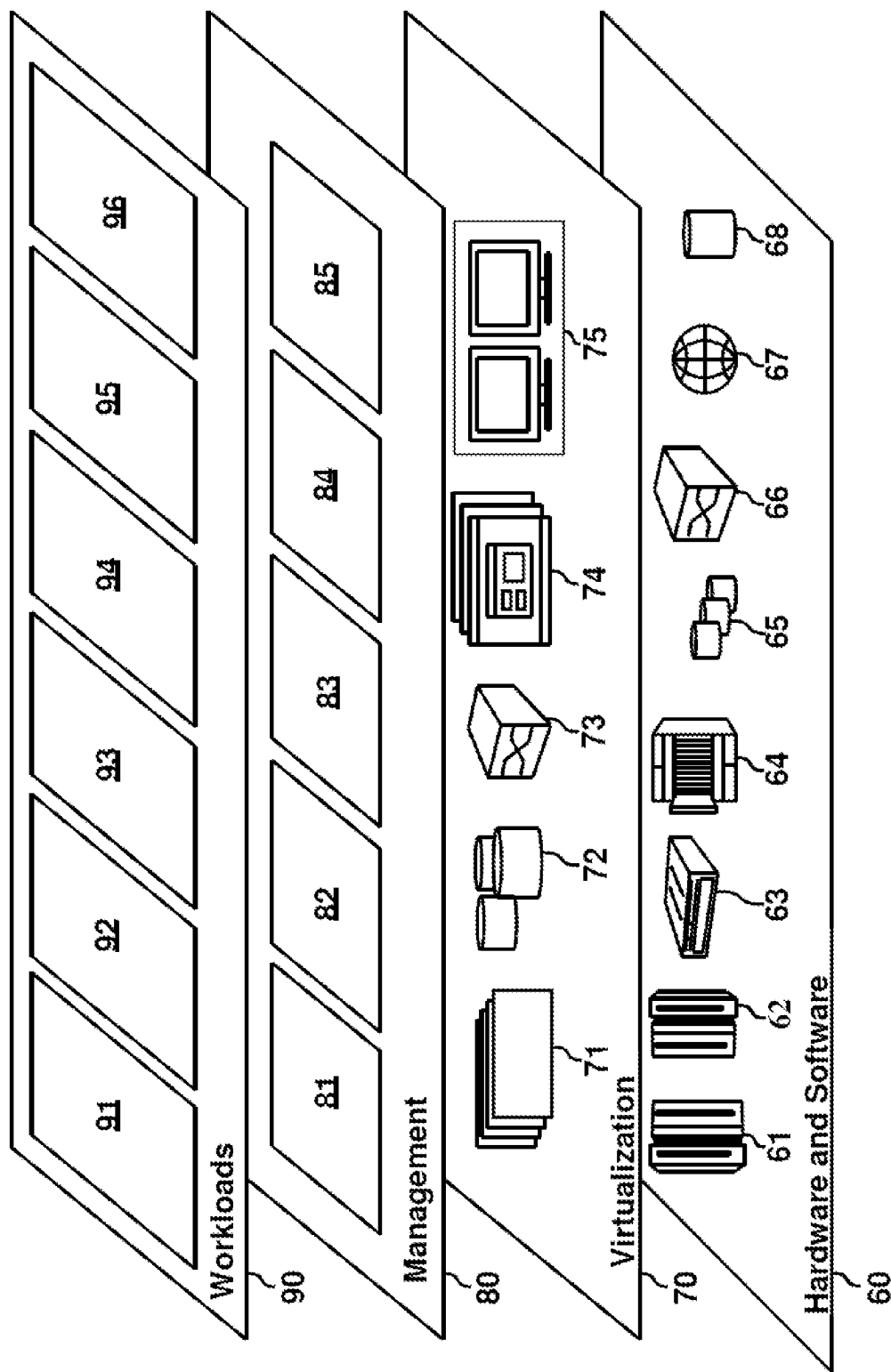
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include software applications 204, logic synthesis software 210, place-and-route software 212, etc.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
defining a power tile within a power distribution network, the power distribution network comprising a grid of power rails, the power tile comprising logic gates;
applying an initial power grid pattern from a plurality of power grid patterns for the power tile such that the initial power grid pattern relates to timing characteristics of the logic gates of the power tile, the plurality of power grid patterns each comprising a different number of connectors, the connectors connecting one power rail to another power rail in the grid of power rails; and
selecting a subsequent power grid pattern from the plurality of power grid patterns for the power tile such that the subsequent power grid pattern meets a threshold condition for the timing characteristics of the logic gates of the power tile, the timing characteristics for the logic gates being determined based on a voltage drop associated with the subsequent power grid pattern having been selected.

2. The computer-implemented method of claim 1, wherein a number of the connectors in the subsequent power grid pattern corresponds to the voltage drop.

3. The computer-implemented method of claim 1, wherein meeting the threshold condition for the timing characteristics of the logic gates of the power tile is based on the voltage drop associated with the subsequent power grid pattern.

4. The computer-implemented method of claim 1, wherein the subsequent power grid pattern for the power tile is selected to have a number of the connectors that meets the threshold condition for the timing characteristics of the logic gates of the power tile, the subsequent power grid pattern having a value for the voltage drop that is sufficient for the timing characteristics of the logic gates.

5. The computer-implemented method of claim 1 further comprising, responsive to selecting ones of the plurality of power grid patterns for a plurality of power tiles, routing wires for all logic gates.

6. The computer-implemented method of claim 1 further comprising determining that at least one location of at least one connector in the power tile remains empty responsive to routing wires for the logic gates.

7. The computer-implemented method of claim 6 further comprising populating the at least one location with the at least one connector in the power tile such that a number of the connectors in the power tile is increased.

8. A system comprising:
a memory having computer readable instructions; and
one or more processors for executing the computer readable instructions, the computer readable instructions controlling the one or more processors to perform operations comprising:
defining a power tile within a power distribution network, the power distribution network comprising a grid of power rails, the power tile comprising logic gates;
applying an initial power grid pattern from a plurality of power grid patterns for the power tile such that the initial power grid pattern relates to timing characteristics of the logic gates of the power tile, the plurality of power grid patterns each comprising a different number of connectors, the connectors connecting one power rail to another power rail in the grid of power rails; and
selecting a subsequent power grid pattern from the plurality of power grid patterns for the power tile such that the subsequent power grid pattern meets a threshold condition for the timing characteristics of the logic gates of the power tile, the timing characteristics for the logic gates being determined based on a voltage drop associated with the subsequent power grid pattern having been selected.

9. The system of claim 8, wherein a number of the connectors in the subsequent power grid pattern corresponds to the voltage drop.

10. The system of claim 8, wherein meeting the threshold condition for the timing characteristics of the logic gates of the power tile is based on the voltage drop associated with the subsequent power grid pattern.

11. The system of claim 8, wherein the subsequent power grid pattern for the power tile is selected to have a number of the connectors that meets the threshold condition for the timing characteristics of the logic gates of the power tile, the subsequent power grid pattern having a value for the voltage drop that is sufficient for the timing characteristics of the logic gates.

12. The system of claim 8, wherein the operations further comprise, responsive to selecting ones of the plurality of power grid patterns for a plurality of power tiles, routing wires for all logic gates.

13. The system of claim 8, wherein the operations further comprise determining that at least one location of at least one connector in the power tile remains empty responsive to routing wires for the logic gates.

14. The system of claim 13, wherein the operations further comprise populating the at least one location with the at least one connector in the power tile such that a number of the connectors in the power tile is increased.

15. A computer program product comprising a computer readable storage medium having program instructions embodied therewith, the program instructions executable by one or more processors to cause the one or more processors to perform operations comprising:
defining a power tile within a power distribution network, the power distribution network comprising a grid of power rails, the power tile comprising logic gates;
applying an initial power grid pattern from a plurality of power grid patterns for the power tile such that the initial power grid pattern relates to timing characteristics of the logic gates of the power tile, the plurality of power grid patterns each comprising a different number of connectors, the connectors connecting one power rail to another power rail in the grid of power rails; and
selecting a subsequent power grid pattern from the plurality of power grid patterns for the power tile such that the subsequent power grid pattern meets a threshold condition for the timing characteristics of the logic gates of the power tile, the timing characteristics for the logic gates being determined based on a voltage drop associated with the subsequent power grid pattern having been selected.

16. The computer program product of claim 15, wherein a number of the connectors in the subsequent power grid pattern corresponds to the voltage drop.

17. The computer program product of claim 15, wherein meeting the threshold condition for the timing characteristics of the logic gates of the power tile is based on the voltage drop associated with the subsequent power grid pattern.

18. The computer program product of claim 15, wherein the subsequent power grid pattern for the power tile is selected to have a number of the connectors that meets the threshold condition for the timing characteristics of the logic gates of the power tile, the subsequent power grid pattern having a value for the voltage drop that is sufficient for the timing characteristics of the logic gates.

19. The computer program product of claim 15, wherein the operations further comprise, responsive to selecting ones of the plurality of power grid patterns for a plurality of power tiles, routing wires for all logic gates.

20. The computer program product of claim 15, wherein the operations further comprise determining that at least one location of at least one connector in the power tile remains empty responsive to routing wires for the logic gates.

* * * * *